Oct. 27, 1959 R. A. BARBEAU ET AL 2,910,536

MULTIPLE PURPOSE UNIT RECORD CONTROL DEVICE

Filed Feb. 1, 1957 6 Sheets-Sheet 1

INVENTORS
RAYMOND A. BARBEAU
JOHN B. NORRIS

BY Marshall M. Truex

ATTORNEY

MULTIPLE PURPOSE UNIT RECORD CONTROL DEVICE

Filed Feb. 1, 1957 6 Sheets-Sheet 2

2,910,536
Patented Oct. 27, 1959

2,910,536

MULTIPLE PURPOSE UNIT RECORD CONTROL DEVICE

Raymond A. Barbeau, Poughkeepsie, and John B. Norris, Hyde Park, N.Y., assignors to International Business Machines Corporation, New York, N.Y., a corporation of New York Application February 1, 1957, Serial No. 637,668

13 Claims. (Cl. 178—92)

This invention relates to a typewriter controlled tape punch, and more particularly to a device actuated by a single key on the typewriter to afford a simple control over machine function codes recorded in tape.

In machines of this type, a typewriter is operated to simultaneously record information on a paper sheet and to effect a punching of the same information in a tape as code perforations. In addition, certain typewriter functions must be controlled, and machine function codes must be entered in the tape for use by the processing device at the time when the recorded information is utilized. Lines of data, conventionally called unit records, are printed across the sheet, and each unit record is set apart by distinctive code designations preceding and following each unit record.

Heretofore, it has been conventional to provide a key or switch to place both the typewriter and the tape punch in a message condition, that is, to unlock the keyboard of the typewriter and prepare the tape punch for the beginning of a record. When different code designations are used to differentiate between beginning-of-message and end-of-record notations, another key has been provided to cause the tape punch to punch code designations indicative of a beginning of a record. Still another key has been provided for use at the end of a line of data (an end of the unit record) to cause the typewriter carriage to return to a new line and also to automatically enter end-of-unit-record code designations in the tape. Furthermore, successive depressions of these functional keys have caused repeated code designations to be entered in the tape which serve no useful purpose and instead cause extra machine cycles at a waste of tape and time. Using multiple keys as described, it is apparent that the accuracy of preparation of hard copy and tape depend upon the selection of the proper key in the sequence of operations and that many errors are likely to occur due to the complexity of the manual control scheme.

Briefly stated, the novel device of the present invention provides a memory device which controls the functions of a single key on the typewriter to cause proper notations to precede and follow each unit amount of data automatically and without decision by the operator. The single key places the machine in a message condition and automatically enters beginning-of-message code designations in the tape, and, thereafter, causes end-of-unit-record codes to be punched at the end of the unit records followed by beginning-of-message code designations for the succeeding unit record. The memory device prevents repetition of beginning-of-message and end-of-unit-record codes upon successive depressions of the key.

It is an object of the invention to provide an improved device for simplifying operation of tape preparation machines by providing a memory device to control logical machine functions in response to machine conditions.

Another object of this invention is to reduce the number of keys which initiate routine functions in a tape preparation machine.

It is another object to provide an improved device which eliminates unnecessary machine function codes in a tape record.

Still another object of this invention is to provide an improved device to increase the speed of preparation of a tape record by providing a single device to control routine logical machine functions.

It is a still further object of this invention to provide a device for automatically recording beginning-of-record code designations at the beginning of the record and to prevent beginning-of-record code designations from being recorded until end of a record codes have been entered in the tape.

It is another object of this invention to provide a device for automatically punching end-of-record codes at the end of a record and for punching end-of-record codes if, and only if, data has been recorded after the beginning-of-record code designation.

It is an object of this invention to provide an improved device to prevent a line feed code from being entered in the data portion of the message.

It is an object of this invention to provide a device to control the preparation of tape, which tape has proper machine function codes to control a data processing device.

It is an object of this invention to provide an improved device which prevents successive recordings of end-of-record codes.

It is an object of this invention to provide an improved device which prevents repetition of beginning-of-record codes.

It is an object of this invention to provide a device which insures that two unit records are not merged due to failure of the operator to insert an end-of-unit-record code group.

It is a still further object of this invention to provide an improved control device to enter beginning-of-record codes in a tape after an error has been noted.

It is an object of this invention to provide a device operated by a single key, which places the machine in a message recording condition and causes a beginning-of-message code designation to be entered in a tape upon depression of the key; which causes an end-of-record code designation to be entered in a tape following unit record data upon depression of the key; and which prevents the repetition of the beginning-of-message code or the end-of-record code upon a successive depression of the key.

Other objects of the invention will be pointed out in the following description and claims and illustrated in the accompanying drawings, which disclose by way of example, the principle of the invention and the best mode, which has been contemplated of applying that principle.

Figure 2:
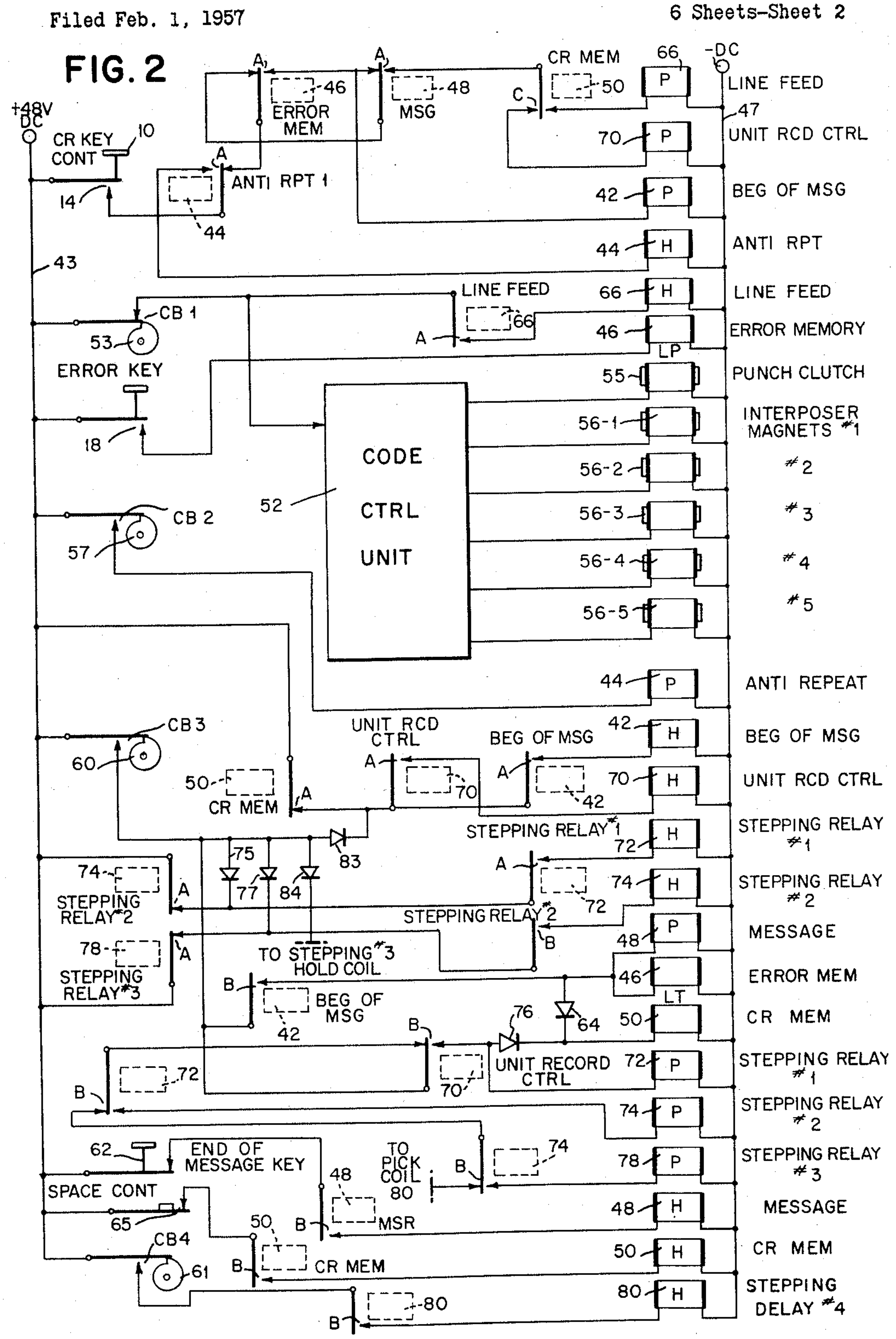
Figure 2 is a diagram of the circuit constructed in accordance with the principles of this invention.
Figure 3:
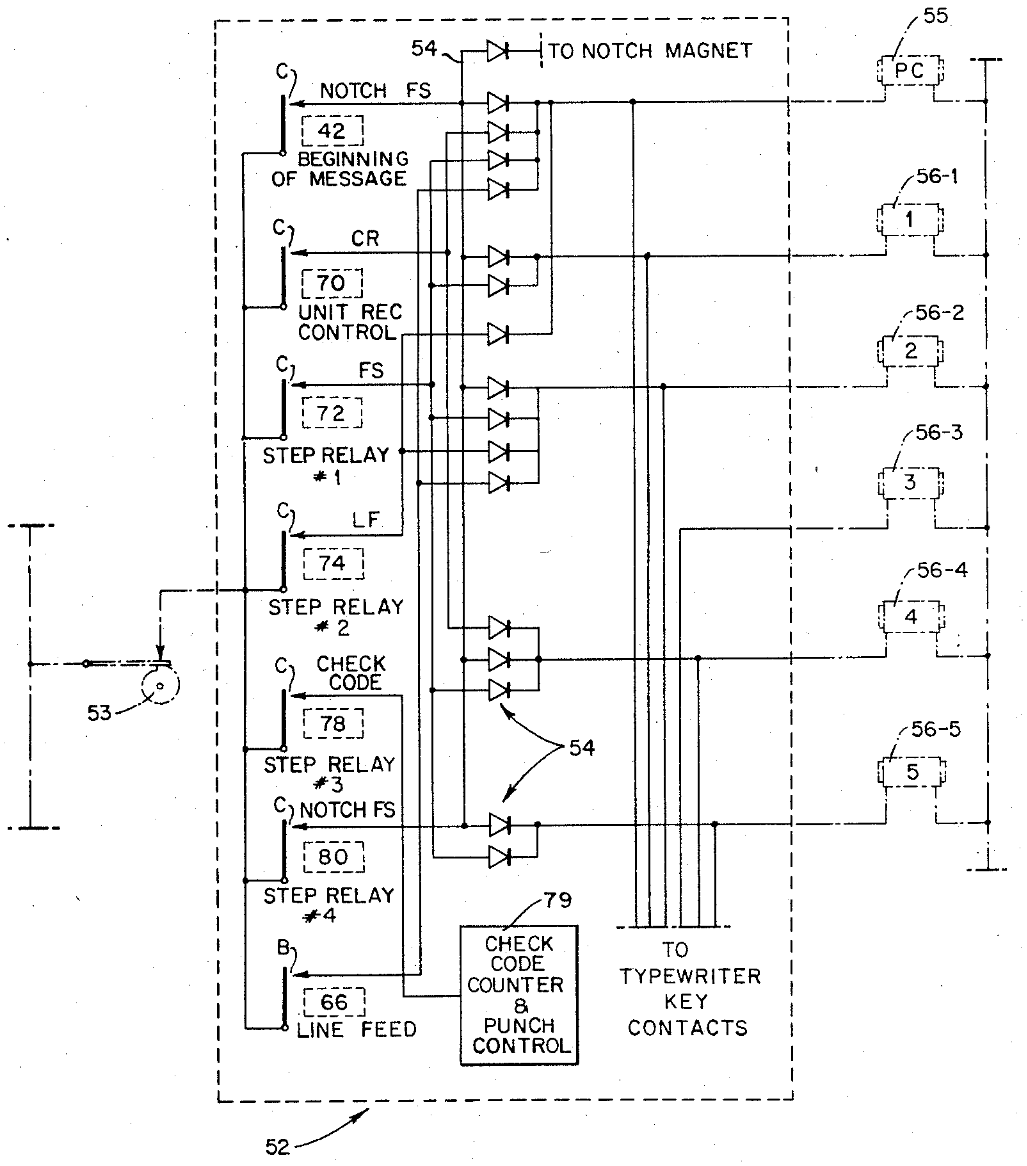
Figure 3 is a circuit diagram of the Code Control Unit shown in Figure 2.

Figures 5, 6, 7, and 8 are sequence charts illustrating operations of the circuit in Figures 2 and 3.

Reference is made to U.S. Patent 2,784,785, Doty, wherein a typical typewriter controlled tape punch machine is described, and co-pending application Serial No. 556,629 filed December 30, 1955, Barbeau, an improvement on the foregoing application of Doty. The basic features of a typical tape punch are shown and described in detail in U.S. Patent 2,540,027.

Figure 1:
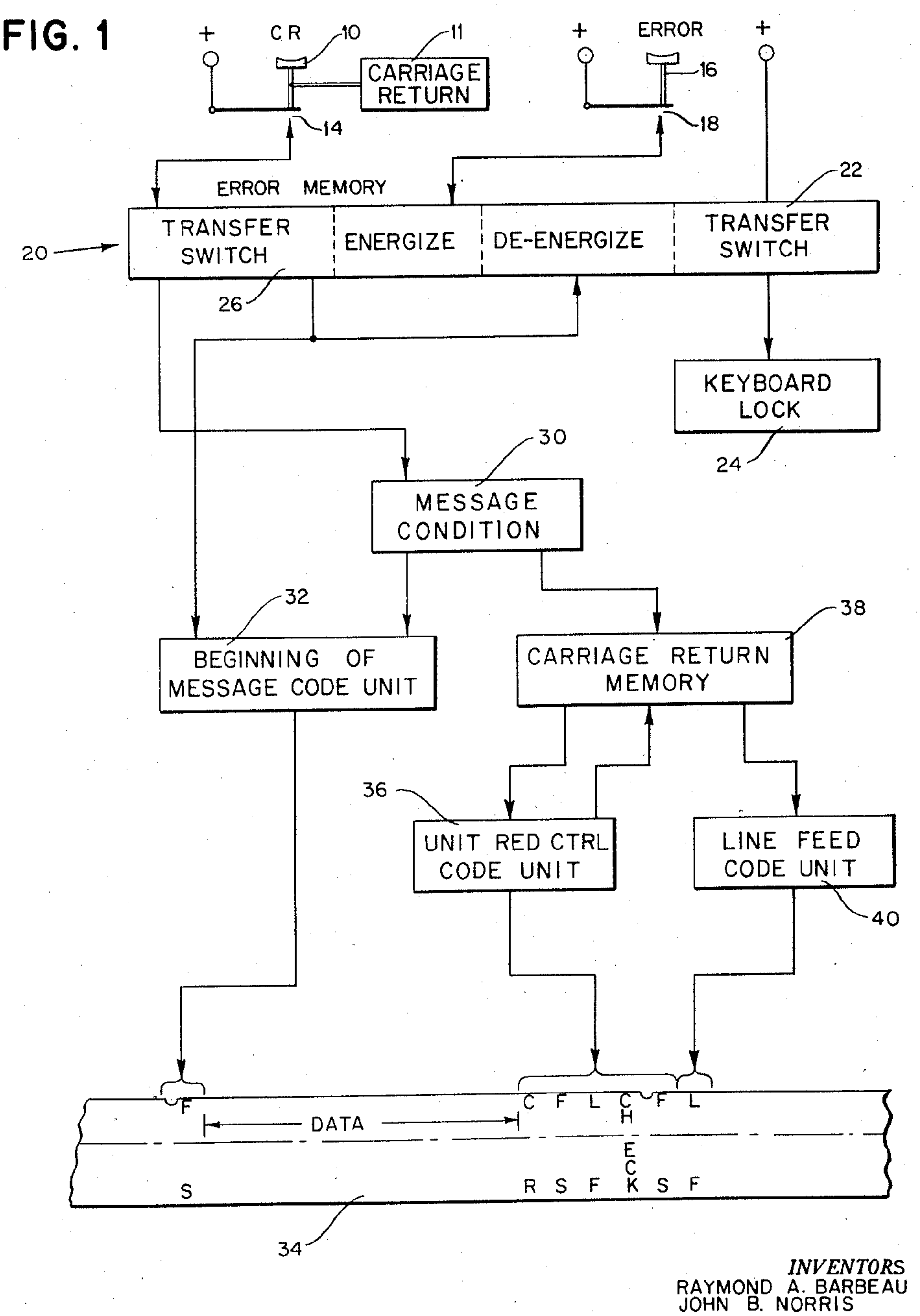
Figure 1 is a functional block diagram illustrating the principles of this invention.

Referring now to Figure 1, to illustrate the general principles of the invention, there is shown a CR (Carriage Return) key 10 which is arranged to cause the usual action of a Carriage Return mechanism 11. A CR contact 14 is arranged to close upon depression of the key 10. An Error key 16 is shown which may operate in conjunction with the device described in co-pending application Serial No. 556,643, filed December 30, 1955. For the purposes of this instant application, the operator depresses the Error key 16 when an error is observed in transcribing data, thereby closing a pair of contacts 18. The closing of the contacts 18 energizes an Error Memory unit 20, which unit operates a Transfer Switch 22 to cause the Typewriter Keyboard lock 24 to block depression of all typewriter keys except the CR key in a manner well known in the art. Further, the Error key 16 operates a Transfer Switch 26 of the Error Memory unit 20 to control the function of the CR key on subsequent operations. It is pointed out that depression of the Error key identifies the particular unit record as being incorrect either by causing the punching of a distinctive error code or by punching a notch in the tape and then obliterating the data in that unit record in a manner described in co-pending application "Automatic Error Deletion for Paper Tape," Serial No. 555,531 filed December 27, 1955. In any case, it is required that the unit record be keyed into the machine once again after an error is detected.

In Figure 1, it is now assumed that the machine is not in a message condition and that the typewriter keyboard is locked, which is the normal state of the machine after an end-of-message key or switch has been operated. Under these circumstances, the only active key is the CR key 10 because it is purposely left free by the Keyboard Lock device. When the CR key is operated, the contacts 14 close causing actuation of the Message Condition circuits 30 through the Transfer Switch 26 and also causing the release of the Keyboard Lock 24. Furthermore, a beginning-of-message code unit 32 is energized causing a notch and FS code to be punched in a tape 34 as the indication of a beginning of a message. While the codes shown on the tape 34 are actually perforated holes in combinations well known in the art, the character itself is shown for clarity.

Data codes are now entered in the tape, and a unit record may consist of a single Data code.

If, for example, the operator depresses the wrong character key and detects the error in the recorded data, the Error key 16 is depressed causing energization of Error Memory 20 and operation of the Keyboard Lock 24 as described previously. When the CR key is depressed, the beginning-of-message code unit 32 is energized causing a beginning-of-message code to be entered in the tape and the carriage to return to the beginning of a new line. The unit record may now be reentered in the tape preceded by the proper identifying codes.

Figure 4:
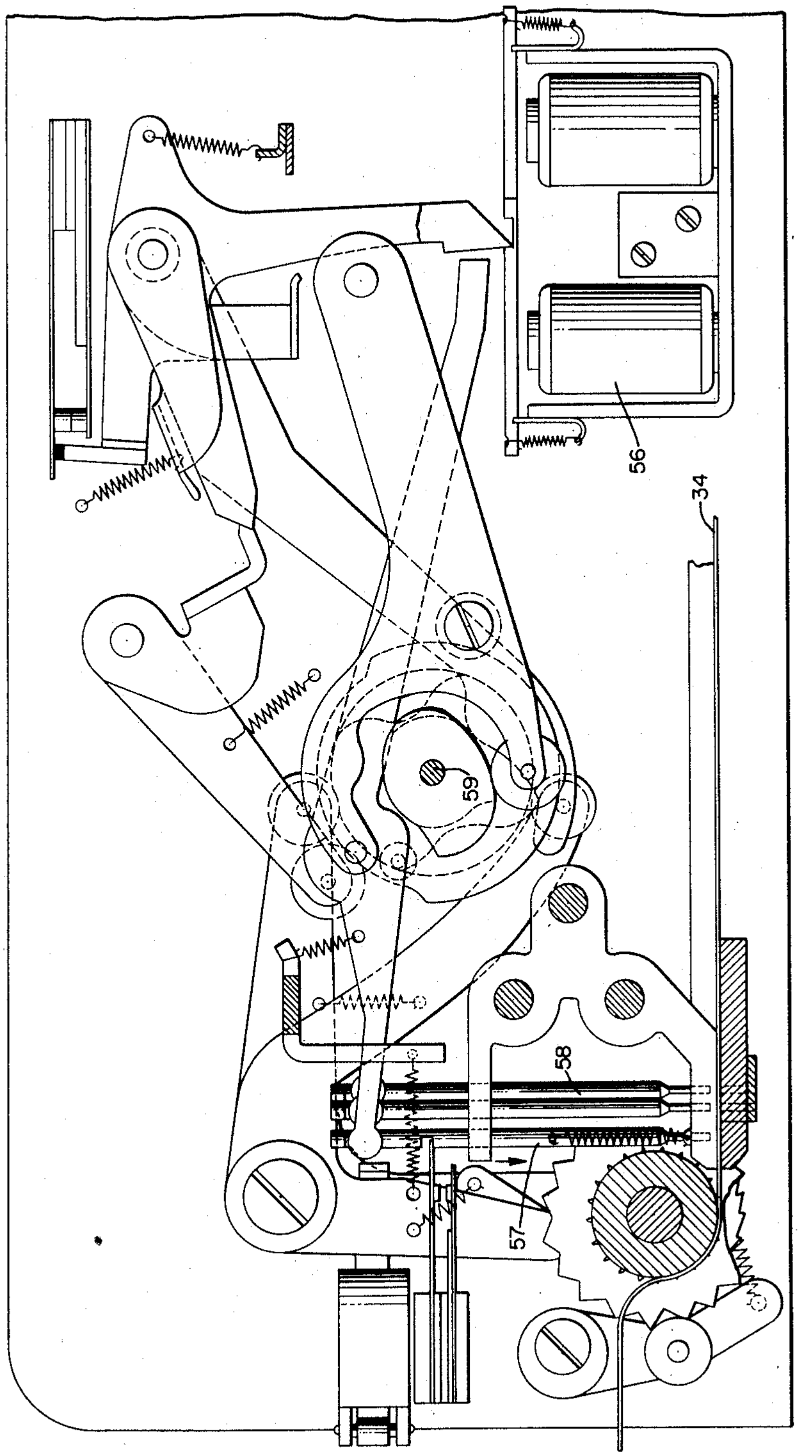
Figure 4 is a side elevation of a tape punch.

In the circuits of Figure 2, assume that the machine is not in a message condition and that the keyboard is locked. As the operator begins to prepare for the entry of records on the tape, the first step must be the depression of the Carriage Return key 10, which is the only operable key at this time. The Carriage Return key depression causes three functions, namely, mechanical action to cause the usual operation of the typewriter carriage, release of the keyboard lock, and energization of a beginning-of-message relay 42. The circuit to energize the beginning-of-message relay 42 is from the positive side of a D.C. voltage line 43, through the CR contact 14, the normal points A of an Anti-repeat relay 44, the normal A points of an Error Memory relay 46, the normal A points of a Message relay 48 and the pick coil of relay 42 to the negative side of a D.C. voltage line 47. A hold circuit for the relay 42 is established from the hold coil of the relay, through having completed the unit record, the CR key is depressed actuating a Unit Record Control unit 36 through the Transfer Switch 26, the Message Condition control 30, and a Carriage Return Memory unit 38. The Unit Record Control unit causes an end-of-unit-record code group comprising, CR (Carriage Return), FS (Figures Shift), and LF (Line Feed) to be entered in the tape 34 followed by a check code (as described in co-pending application, Serial No. 553,001, filed December 14, 1955) and a notch and a Figures Shift code. It will be recognized that a notch, FS notation is indicative of a beginning of a message and a beginning of a record as well. In addition, the Unit Record Control 36 causes operation of the Carriage Return Memory 38, which stores the fact that a carriage return has occurred until a cycle is taken which records a data code in the tape. By means of the Carriage Return mechanism 11, the typewriter carriage has returned to a new line. If the operator depresses the CR key at this time, before any other keys are depressed to record data code, a Line Feed Code unit 40 is energized through the Transfer Switch 26, the Message Condition device 30, and the CR Memory 38. The Line Feed Code unit 40 causes a Line Feed code to be entered in the tape instead of repeating the preceding code group. Although the Carriage Return mechanism has been actuated, the typewriter platen is merely indexed one unit to another line in the usual way. On the first cycle wherein a data code is entered in the tape, the Carriage Return Memory unit is deenergized because its own A points, the normally closed A points of a CR memory relay 50, and to the positive side of the line. The beginning-of-message relay actuates a code control unit 52 to cause a cycle of the punch clutch to produce a notch and a Figures Shift (FS) code perforation in the tape. The Code Control unit 52 incorporates the beginning-of-message code unit 32, the Unit Record Control code unit 36, and the Line Feed Control unit 40 of Figure 1. In Figure 3, the contacts of the cam 53 are closed and the C points of the beginning-of-message relay 42 to complete parallel circuits, one through a conductor 54 to a notch magnet (not shown), another through a punch clutch magnet 55, and others through interposer magnets 56–1, 56–2, 56–4 and 56–5, thereby causing a notch and a FS code to be punched in the tape. In Figure 4, the notch magnet actuates a pin 57 to perforate an edge of the tape in the manner described in detail in co-pending application, Serial No. 555,531, filed December 27, 1955. In the well-known manner, the punch pins 58 perforate the tape 34 is response to actuation of the interposer magnets 56 and the turning of a shaft 59, the latter being operated when the punch clutch magnet 55 is energized. Rotation of the shaft 59 also causes the tape 34 to advance and cams 53, 57, 60 and 61 to turn, thereby closing contacts to which specific timing relations are assigned as indicated in Figures 5, 6, 7 and 8. In Figure 3, diodes 54 are provided merely to prevent back circuits in the usual manner.

Figure 5:
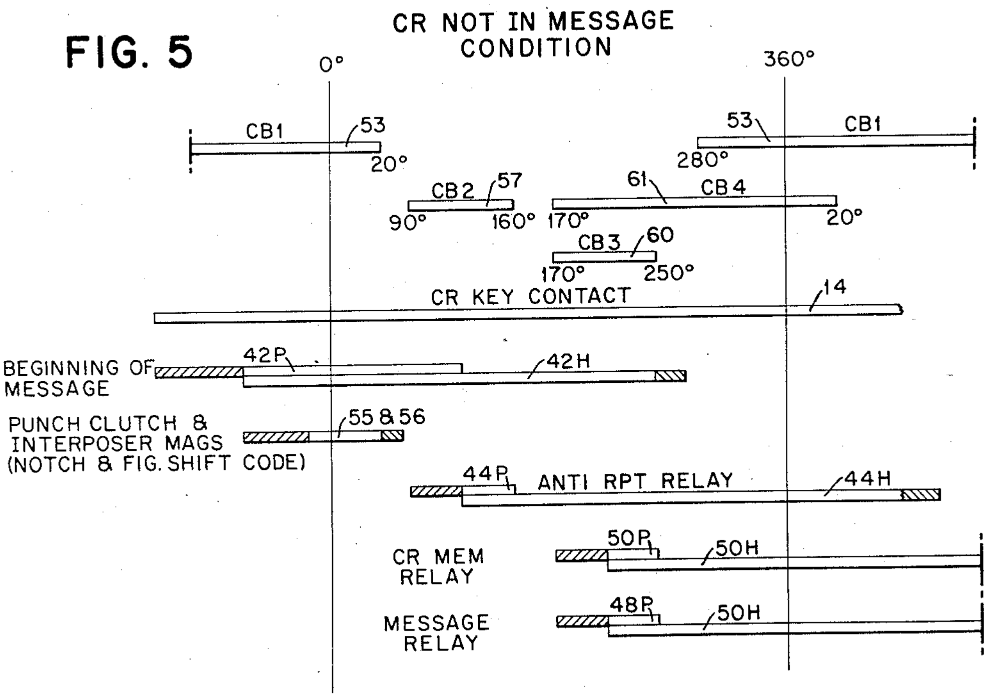

As the punch clutch shaft 59 makes its first revolution, a pair of contacts CB2 (Figure 2) are closed under control of a cam 57 and energize the pick coil of the Anti-repeat relay 44. This causes the A points of the relay 44 to transfer and establish a circuit through the hold coil of relay 44 and the CR contacts 14 if the latter are held closed. The transfer of the A points for relay 44 also breaks the circuit through the pick coil of relay 42, and, since the A points of relay 44 are held transferred as long as the CR contact 14 is closed, it is not possible to cause a re-energization of the pick coil for relay 42 by continuing to hold the CR key depressed. The sequence of operations is shown in Figure 5.

When the beginning-of-message relay 42 is energized and a pair of contacts CB3 are closed by a cam 60 on the first punch cycle, the Message relay 48, the Error Memory relay 46 (Latch Trip), and the CR Memory relay 50 are energized through the B points of the beginning-of-message relay 42 and the cam contacts 60. The Latch Trip coil of Error Memory relay 46 is ineffective at this time since its purpose is to release its own contacts if said contacts have been latched up due to energization of the pick coil of the Error Memory relay 46. A relay of this type is illustrated and described in U.S. Patent No. 2,510,604 and is well known in the art. A hold circuit is established for the Message relay through its own B points and an end-of-message key 62 to the positive side of the line, and this circuit remains established until the tape has been processed and the operator depresses the end-of-message key. The CR Memory relay pick coil was energized in this instance through a diode 64 used to prevent the energization of relays 46 and 48 from a second pick circuit for CR Memory relay 50 to be explained hereafter. A hold circuit for CR Memory relay 50 is provided through its own normally open, now closed, B points and a space contact 65, normally closed. This hold circuit remains established until the first depression of either a Character key or the space bar which causes a letter space and the opening of the space contact 65. Therefore, it will be appreciated that CR Memory is held until the first cycle when record data is punched in the tape. Thus, after the beginning-of-message code has been punched (the first tape punch cycle taken), a second depression of the CR key 10 energizes a Line Feed relay 66 pick coil through the transferred C points of the CR Memory relay 50, through the transferred A points of the Message relay 48, through the normal A points of the Error Memory relay 46, and through the A points (now normal) of the Anti-repeat relay 44. Its hold circuit is established through its own A points and contacts of the cam 54. This depression of the CR key causes the usual Line Feed function of the typewriter, and the Line Feed relay 66 energizes the Code Control unit 52 to cause a Line Feed code to be punched in the tape. In Figure 3, the B points of Line Feed relay 66 energize the punch clutch magnet 55 and interposer magnet 56–2. It is pointed out that no data has been punched in the tape so it was not necessary to punch end-of-record codes in the tape. Accordingly, because of the circuit just explained, no end-of-record codes can be punched in the tape until one cycle has been taken which records a data code in the tape.

Assume now that one column of data has been punched in the tape, for example, the character "A." As the "A" is printed on the paper held on the platen, the space contact 65 is opened causing de-energization of the CR memory hold coil 50. By definition, a record consists of at least one data code so that the machine should now be conditioned to punch an end-of-record code group at the next depression of the CR key. However, it will be realized that numerous other data codes could follow the first data code until a line on the paper sheet is complete. With these conditions in mind, depression of the CR key causes energization of the Unit Record Control relay 70 from the positive side of the line through the CR contacts 14, the normal A points of the relay 44, the transferred A points of the relay 48, the normal C points of the relay 50, and the pick coil of the relay 70. Its hold circuit is established through its own A points, through the normal A points of the CR memory relay 50 to the positive side of the line. As a result of the energization of the Unit Record Control relay 70, the machine is caused to take five punch cycles and punch end-of-record codes (CR, FS, LF), a check code, and beginning-of-record codes (notch, FS) in the manner to be described hereafter.

Figure 6:
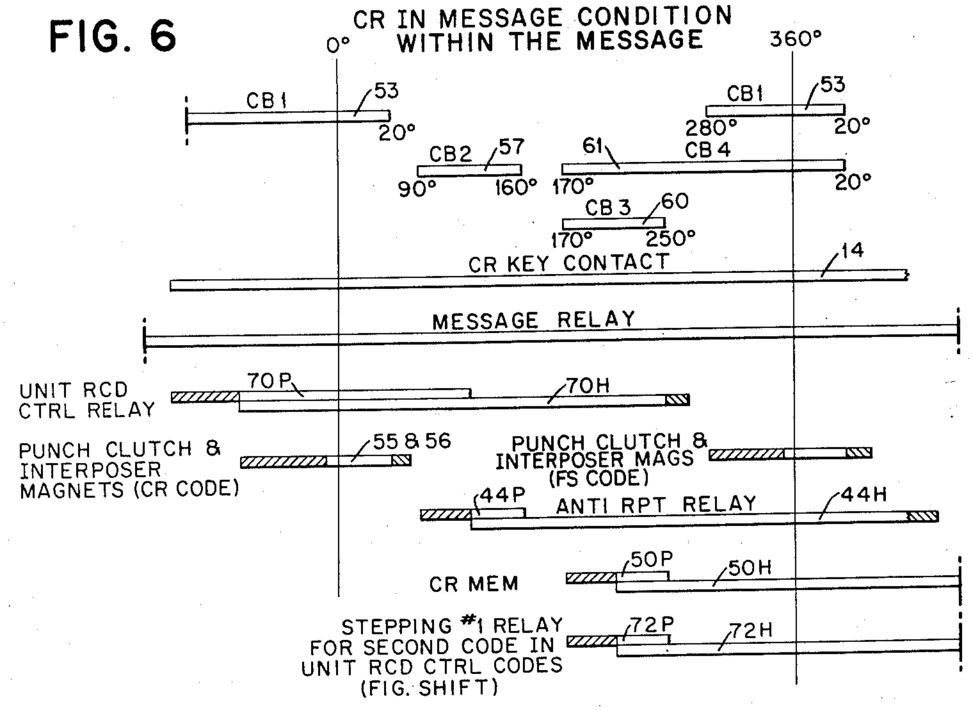

In Figure 3, the C points of the unit Record Control relay 70 complete circuits to the punch clutch magnet 55 and the interposer magnet 56–4 to punch a CR code in the tape. In Figure 2, the pick coil of a Stepping #1 relay 72 is energized through the transferred B points of the relay 70 and the contacts CB3 controlled by the cam 60. Its hold coil is energized through its own A points which are connected to branch circuits, one including the A points of a Stepping #2 relay 74 and the other including a diode 75 and the contacts CB3 of the cam 60. At the time that the Stepping #1 relay 72 is energized, the CR Memory relay 50 is energized in parallel with the relay 72 through a diode 76. The hold coil of relay 50 is energized through its own B points and the space contact 65. Since the machine cycles taken as a result of this depression of the CR key do not involve a spacing operation of the typewriter, the hold of the CR Memory relay is preserved until the first data cycle is taken. The A points of the CR Memory relay 50 de-energize the unit Record Control relay 70 since the latter has caused a CR code to be punched in the tape as required. The sequence is illustrated in Figure 6.

Figure 7:
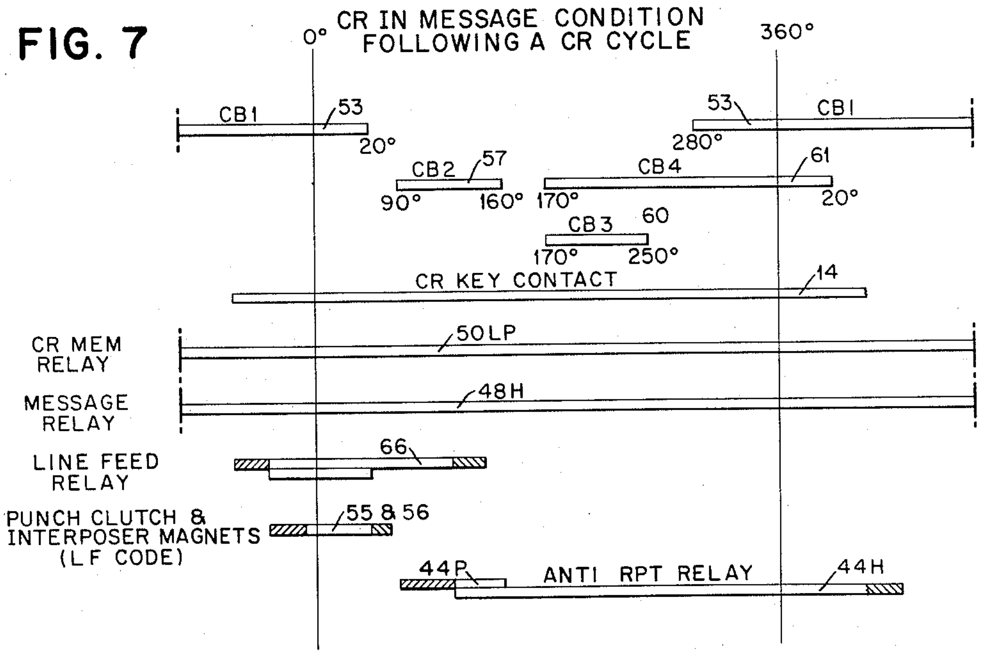

In Figure 3, the C points of relay 72 close and energize the punch clutch magnet 55 and the interposer magnets 56–1, 56–2, 56–4 and 56–5 to cause a FS code to be punched in the tape. In Figure 2, the Stepping #2 relay 74 is energized through the transferred B points of the Stepping #1 relay 72, the normal B points of the relay 70, and the contacts of the cam 60. Its hold circuit is established through its own B points and through the A points of a Stepping #3 relay 78 and preserved through a diode 77 and contacts of the cam 60 until 250 degrees. Relay 74 causes a LF code to be punched in the tape by the closing of the 74–C points in Figure 3. These points energize the punch clutch magnet 55 and the interposer magnet 56–2. The sequence of operations for the LF code cycle is shown in Figure 7.

The pick coil of the Stepping #3 relay 78 is energized through the transferred B points of the relay 74, the normal B points of the relay 72, the normal B points of the relay 70, and the contacts of the cam 60. The hold coil (not shown) for relay 78 is energized by its own points (not shown) and a diode 84 in the same manner as the hold circuits are established and held for the former Stepping relays 72 and 74. The A points of the relay 78 open and the hold coil of relay 74 continues to be energized through the contacts of the cam 60 until the latter opens at 250 degrees. In Figure 3, the C points of the relay 78 energize the Check Code unit 79 causing a code to be punched in the tape if a check has been satisfied as described in copending application Serial No. 553,001, referred to previously.

The pick coil (not shown) of a Stepping #4 relay 80 is energized from contacts of the cam 60, the normal B points of the relay 70, the normal B points of the relay 72, the normal B points of the relay 74, and a pair of transferred points (not shown) of Stepping #3 relay 78. It will be realized that the manner of sequentially energizing relays is well known in the art and the complete circuits are not necessary to an understanding of their operation. The hold coil of the Stepping #4 relay is shown in Figure 2, and it is energized through the transferred B points and the contacts of the cam 61, which contacts are closed until the early portion of the next cycle. In Figure 3, the C points of the relay 80 cause a notch and FS code to be entered in the tape by completing a circuit to the notch magnet, the punch clutch magnet 55, and the interposer magnets 56–1, 56–2, 56–4, and 56–5. When the contacts of the cam 61 break, no further automatic cycles are taken in this sequence of operation.

During the first of the five cycles just described, the carriage of the typewriter executed a carriage return and a line feed to present a new line in printing position. When the automatic cycles are complete, information may be entered in the tape in the usual way preceded by the beginning-of-record code. If desired, the cycling relay may be used to control the keyboard locking device to prevent operation of the keyboard until the beginning-of-record code has been punched.

For the purposes of illustration, assume that several columns of data have been entered in the tape and that the operator makes an error and realizes that incorrect information has been entered in the tape. In Figure 2, the Error key 18 is depressed causing the pick coil of the Error Memory relay 46 to be energized. The contacts of the relay 46 latch close and remain so until its latch trip coil is energized. The Error Memory relay 46 controls those functions related to error identification and deletion as previously mentioned, locks the keyboard, and conditions circuits for the entry of the beginning-of-message code into the tape.

Figure 8:
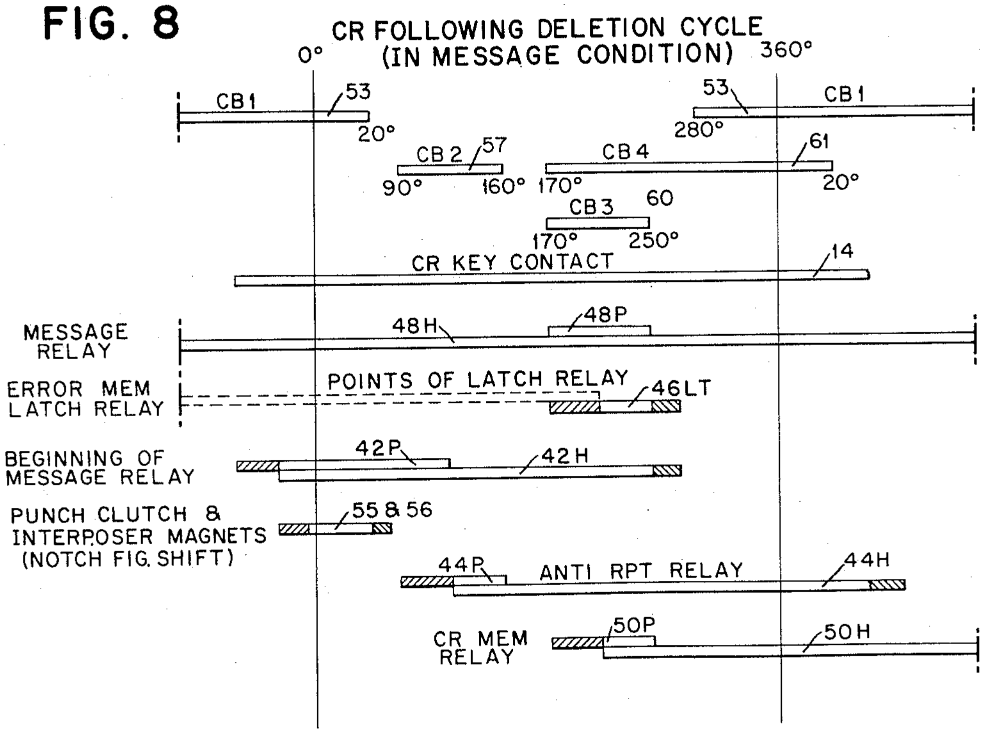

In Figures 2 and 8, when the operator desires to reenter the unit record in the tape, the CR key 10 is depressed which provides a carriage return and line feed operation of the typewriter and unlocks the keyboard. Further, the closing of the CR contact 14 energizes the beginning-of-message relay 42 through the transferred A points of the Error Memory relay 46. The hold coil of the relay 42 is held energized through its own A points and the A points of the relay 50 to the positive side of the line. The hold is prolonged after the A contacts of the relay 50 open by a circuit through a diode 83 and the contacts of the cam 60.

As previously explained, the C points of the relay 42 in Figure 3 cause a punch cycle and the entry of a notch, FS code in the tape. In Figure 2, the B points of the beginning-of-message relay 42 cause the energization of the pick coil of the Message relay 48, the latch trip coil of the Error Memory relay 46, and the pick coil of the CR Memory relay 50. Energization of the relay 48 serves no useful purpose since its hold coil has remained energized as indicated in Figure 7. Energization of the latch trip coil of the relay 46 unlatches the contacts of the Error Memory relay 46 and contacts open. The CR Memory relay is energized at this time to condition circuits to provide a LF code if the CR key is depressed since there is no need for entering end-of-unit-record codes, a check code, and another beginning-of-record code.

If the error check described in co-pending application Serial No. 553,001, filed December 14, 1955, is not satisfied the Stepping relay circuits may be interrupted at the end of the check cycle to prevent tape feeding and the entry of the beginning-of-message notation. Then, according to co-pending application Serial No. 555,531, filed December 27, 1955, the unit record or a portion thereof may be deleted. Since an error would have been noted, operation of the CR key causes entry of a beginning-of-message code in the tape.

It is pointed out that other keys may be used in conjunction with this device to control the machine and punch notations within the record as, for example, when specified fields of data within a record are identified by program notations. Thus, a program key may be operated immediately after beginning-of-record codes have been entered in the tape to segregate portions of data within a record by a code notation, which code may be treated as a data code in the instance of this application.

While the invention has been illustrated using perforations in tape to record data and machine function notations, it is pointed out that the device is applicable to machines which record data on magnetic tape, photosensitive tape, and other record media of like purpose, and it is not intended that the invention be limited specifically to perforated tape.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a typewriter controlled data recording machine for recording data in the form of printing on a sheet and detectable indicia on a record medium in unit record amounts, each of said unit records comprising at least code indicia indicative of a beginning-of-record notation, data, and an end-of-record notation, a device actuated by a control key on the typewriter, comprising first means for selectively actuating the machine to enter a beginning-of-record indicia, an end-of-record indicia, and a predetermined code indicia on said record medium, second means effective when said control key is operated a first time for placing said machine in a message recording condition and for actuating said first means to enter the beginning-of-record indicia in said medium, third means for storing the fact that a beginning of record indicia has been entered in said medium, said storage being effective until a data code has been entered in said medium, fourth means effective when said control key is operated a second time, and said third means is effective, for entering the predetermined code indicia in said medium, and fifth means effective when said control key is operated a second time, and said third means is ineffective, for sequentially entering an end-of-record indicia and a beginning-of-record indicia in said record medium.

2. A claim in accordance with claim 1 wherein sixth means are provided to distinguish incorrect unit records and to condition said first means to respond to a next operation of said control key, said response being an entry of a beginning-of-record indicia in said record medium.

3. A claim in accordance with claim 1 wherein keyboard locking means are provided for said typewriter, said means being ineffective to lock said control key and said means being effective to lock said keyboard when said machine is not in a message condition and ineffective when said machine is in a message condition.

4. A claim in accordance with claim 2 wherein keyboard locking means are provided for said typewriter, said means being effective to lock said control key and said means being effective to lock said keyboard when said first means is conditioned by said sixth means and being ineffective after a next operation of said control key.

5. A claim in accordance with claim 1 wherein said fourth means is effective when said control key is operated a third time and said third means is operated for entering the predetermined code indicia in said record medium.

6. In a typewriter controlled recording machine for recording data in tape in record unit amounts, each of said unit records comprising at least code indicia indicative of a beginning-of-record notation, data, and an end-of-record notation, a device actuated by a control key on said typewriter, comprising a first transfer switch having a normal and an actuated position, a first control device responsive to an initial depression of said key to cause the beginning-of-record indicia to be entered in said tape, a second control device responsive to actuation of said first control device to move said first transfer switch to an actuated position, a second transfer switch having a normal and an actuated position, a third control device responsive to actuation of said first control device to store the beginning-of-record state of the machine until at least one data indicia has been entered in said tape and to transfer said second switch to the actuated position, a fourth control device effective when said first switch and said second switch are in the actuated positions and said control key is operated to cause a predetermined code indicia to be entered in said tape, and a fifth control device effective when said first switch is in the actuated position, said second switch is in the normal position, and said control key is operated to cause the end-of-record indicia and the beginning-of-record indicia to be entered in said tape in sequence.

7. In a typewriter controlled recording machine for recording data in a tape in unit record amounts, each of said unit records comprising code indicia of a beginning of a unit record, data, and an end of a unit record, said machine having a typewriter with a paper-supporting carriage, said carriage position at the beginning of a line corresponding to the position of the tape at the beginning of a record, a device actuated by a typewriter key which returns the carriage to the beginning of a next adjacent typing line, comprising means responsive to a depression of said key for entering the beginning-of-unit-record indicia in said tape when said carriage is moved from the end of a data line to the beginning of an adjacent line, means responsive to the depression of said key for entering a line feed indicia in said tape when said carriage is moved from the beginning of one data line to the beginning of another, and means responsive to the depression of said key for entering an end-of-unit-record indicia in said tape after at least one data code has been recorded following a beginning-of-unit-record indicia.

8. In apparatus for printing data in lines across a copy sheet and concurrently therewith recording data-representing indica into a record tape, the combination, comprising a control key, printing means including a carriage movable successively to different character space positions and movable from one line to the next when actuated by said control key, a plurality of selectively actuable type elements operable when actuated to print corresponding characters, spacing means operable when actuated to advance said character space position, a recording device, means for selectively generating code indicia representing machine functions, means for rendering said recording device active to enter into a record tape indicia representing the character of said type elements when the latter are actuated and indicia representing machine functions when said code generating means is operated, and means actuated by said control key effective to operate said code generating means to produce machine function indicia of a distinct notation of the beginning of a line of data and a distinct notation of the end of a line of data.

9. A claim in accordance with claim 8 wherein a keyboard locking device is provided which is ineffective to block said control key and additional means are provided to render ineffective said locking device upon operation of said control key at the first data line on said sheet.

10. A claim in accordance with claim 8 wherein the last-mentioned means includes a memory device to store the fact that a beginning-of-message indicia has been recorded and prevent repetition of the latter indicia upon the successive operation of said control key and to store the fact that an end-of-record indicia has been recorded and prevent repetition of the latter indicia upon the successive operation of said control key.

11. A typewriter controlled recording machine, said typewriter including a plurality of keys, comprising, in combination, a control key, means normally locking all of the typewriter keys except said control key, means operating upon a first actuation of said control key for unlocking the other typewriter keys and simultaneously recording in the tape a beginning-of-message indicia, means operating upon actuation of said other typewriter keys for recording corresponding data indicia in said tape following said beginning-of-message indicia, and means made effective upon actuation of any of said other typewriter keys for causing, by a further single actuation of said control key, a recording in said tape of an end-of-message indicia.

12. A typewriter controlled tape punch comprising, in combination, a control key, means normally locking all of the typewriter keys except said control key, means operating upon a first actuation of said control key for unlocking the other typewriter keys and simultaneously punching in the tape a beginning-of-message indica, means made effective by the first actuation of said control key for causing, by each actuation of said control key prior to the actuation of any other typewriter key, a punching of a line-shift indicia in said tape, means operating upon actuation of any of said other typewriter keys for rendering said last mentioned means ineffective and simultaneously causing a punching of corresponding indicia in the tape, and means made effective upon actuation of any of said other typewriter keys for causing, by a further actuation of said control key, a punching in said tape of an end-of-message indicia.

13. A typewriter controlled tape punch comprising, in combination, a plurality of operable key levers for said typewriter including a control key, means operating upon a first actuation of said control key for entering a beginning-of-message indicia in said tape and for simultaneously placing said typewriter in condition for causing data to be entered in said tape by actuating data keys of said typewriter, means made effective by the first actuation of said control key for causing, by each actuation of said control key prior to the actuation of any data typewriter key, a punching of a predetermined indicia in said tape, means operating upon actuation of any of said data typewriter keys for rendering said last mentioned means ineffective and simultaneously causing a punching of corresponding data indicia in the tape, and means made effective upon actuation of any of said data typewriter keys for causing a subsequent actuation of said control key to enter an end-of-message indicia in said tape followed by a beginning-of-message indicia.

References Cited in the file of this patent

UNITED STATES PATENTS

| | | |
|---|---|---|
| 2,749,985 | Johnson | June 12, 1956 |
| 2,755,860 | Dreher | July 24, 1956 |
| 2,796,127 | Johnson | June 18, 1957 |